G. W. TINSLEY & A. HACKMAN.
COFFEE-ROASTER.
No. 191,900.  Patented June 12, 1877.
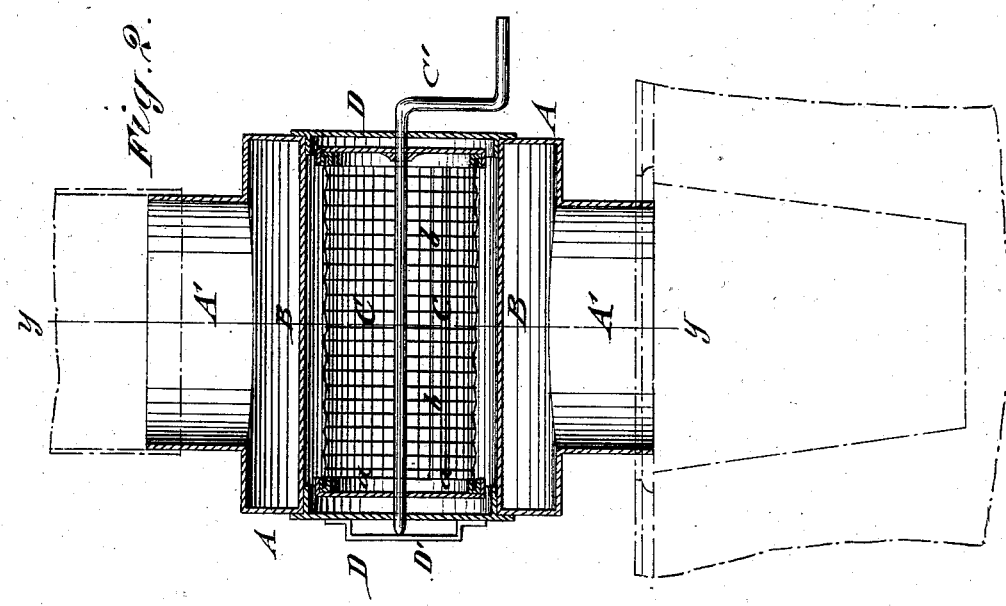
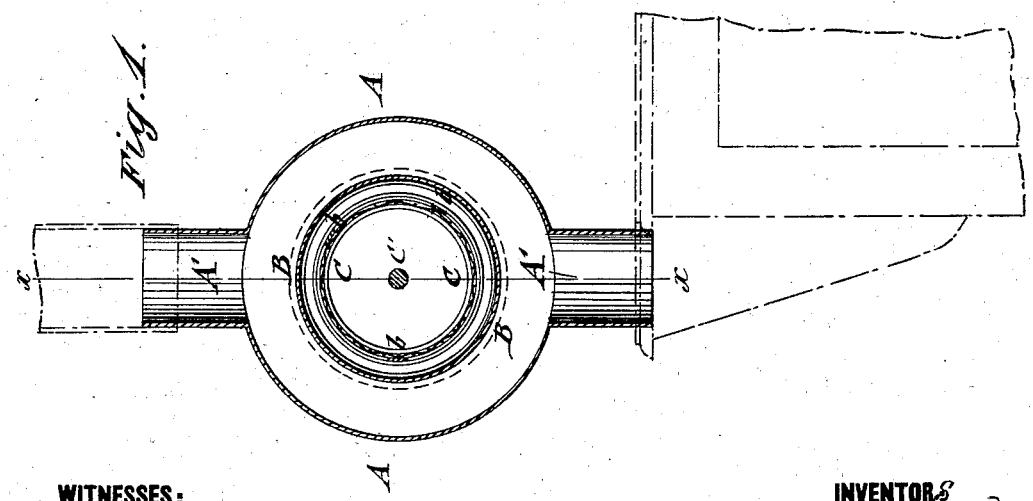

UNITED STATES PATENT OFFICE.

GEORGE W. TINSLEY AND AMANDES HACKMAN, OF BLAKESBURG, IOWA.

IMPROVEMENT IN COFFEE-ROASTERS.

Specification forming part of Letters Patent No. 191,900, dated June 12, 1877; application filed March 12, 1877.

*To all whom it may concern:*

Be it known that we, GEORGE W. TINSLEY and AMANDES HACKMAN, of Blakesburg, in the county of Wapello and State of Iowa, have invented a new and Improved Coffee-Roaster, of which the following is a specification:

In the accompanying drawing, Figure 1 represents a vertical transverse section on line $y\,y$, Fig. 2, and Fig. 2 a vertical longitudinal section on line $x\,x$, Fig. 1, of our improved coffee-roaster.

Similar letters of reference indicate corresponding parts.

The invention relates to an improved coffee-roaster, by which the flavor of the coffee is fully retained, and the same roasted in convenient manner without interfering with the cooking operation of the stove.

The invention consists of a drum with end pipes connecting with the stove-opening and the chimney-pipe, the drum having an interior heating-cylinder with detachable heads, in which a revolving wire-cloth cylinder is supported.

In the drawing, A represents the outer drum, of cylindrical shape, and suitable sheet metal, which is connected by an oval-bottom pipe, A', with the exit-hole of the stove, and by a similar top pipe, A', with the stove-pipe, passing to the chimney. Where coffee is to be roasted, the drum may be placed into position on the stove, or the same may remain on the stove as a stationary fixture, as desired. The inside of the drum A is provided with a stationary cylinder, B, of less diameter, around which the smoke and fire gases pass, so as to heat up the same. The heating-cylinder B is open at the ends and closed by detachable lids D, that are tightly fitted therein, supporting in center holes or bearings the crank-shaft C' of a revolving wire-cloth cylinder, C, into which the coffee is placed for being roasted. A handle, D', of the head D, serves as stop for the end of the crank-shaft of the roasting-cylinder. The roasting-cylinder C has one stationary cap keyed thereto, near the crank end, and a detachable cap at the opposite end, through which the coffee is put in and taken out. The wire-cloth and end binding $a$ of the roasting-cylinder, are strengthened by longitudinal stays $b$, that give the required stiffness to the end binding and for the support of the coffee.

To charge the roaster, the crank-shaft is taken hold of, and the roasting-cylinder drawn out, which also removes one lid of the heating-cylinder. The detachable cap of the roasting-cylinder is then taken off and the roaster filled about half full with coffee. The cap is then replaced, and the roasting-cylinder returned to its position in the heating-cylinder, the lid being pressed firmly back to close the heating-cylinder. The roasting-cylinder is then turned slowly, and partly withdrawn, from time to time, to note the progress of the roasting process, the stove-pipe damper being turned, to regulate the heat required, until the roasting process is completed.

Having thus described our invention, we claim as new and desire to secure by Letters Patent—

1. A coffee-roaster, consisting of a drum with pipes A', an interior cylinder with detachable heads, and within the latter a wire-cloth cylinder, arranged substantially as shown and described.

2. The combination of the interior heating-cylinder, having detachable heads, with the revolving roasting-cylinder, whose shaft is supported in center bearings of the heads, and resting against stop-plate of outer head, substantially as herein described.

GEORGE W. TINSLEY.
AMANDES HACKMAN.

Witnesses:
D. C. RYBOLT,
D. L. HARDY.